(12) United States Patent
Zhang et al.

(10) Patent No.: US 10,067,793 B2
(45) Date of Patent: Sep. 4, 2018

(54) DATA PROCESSING METHOD AND APPARATUS FOR EXECUTING TASK CODE USING RESERVATION INSTRUCTION AND RELEASE INSTRUCTION

(71) Applicant: Huawei Technologies Co., Ltd., Shenzhen (CN)

(72) Inventors: Lixin Zhang, Beijing (CN); Biwei Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 15/255,715

(22) Filed: Sep. 2, 2016

(65) Prior Publication Data

US 2016/0371123 A1 Dec. 22, 2016

Related U.S. Application Data

(63) Continuation of application No. PCT/CN2014/090960, filed on Nov. 13, 2014.

(30) Foreign Application Priority Data

Mar. 4, 2014 (CN) .......................... 2014 1 0076806

(51) Int. Cl.
*G06F 9/46* (2006.01)
*G06F 7/38* (2006.01)
*G06F 9/50* (2006.01)

(52) U.S. Cl.
CPC ............. *G06F 9/5005* (2013.01); *G06F 9/50* (2013.01); *G06F 9/5022* (2013.01); *G06F 9/5027* (2013.01); *G06F 2209/5018* (2013.01)

(58) Field of Classification Search
None
See application file for complete search history.

(56) References Cited

U.S. PATENT DOCUMENTS

| 6,507,862 B1 | 1/2003 | Joy et al. |
| 8,209,701 B1 | 6/2012 | Roytman et al. |

(Continued)

FOREIGN PATENT DOCUMENTS

| CN | 102378961 A | 3/2012 |
| CN | 102567090 A | 7/2012 |
| CN | 102681894 A | 9/2012 |
| EP | 2434401 A1 | 3/2012 |

OTHER PUBLICATIONS

Jesshope, C., et al., "Micro-threading: A New Approach to Future RISC," 5th Australasian Computer Architecture Conference, Jan. 31-Feb. 3, 2000, 8 pages.

(Continued)

*Primary Examiner* — Bing Zhao
(74) *Attorney, Agent, or Firm* — Conley Rose, P.C.

(57) ABSTRACT

A data processing method and apparatus, where the method comprises an operating system loads a task code to a reserved hardware thread such that the reserved hardware thread executes the task code subsequently after receiving a hardware thread reservation request. Alternatively, in a process in which an operating system loads a task code to a hardware thread for execution, the hardware thread loads the small task code to a reserved hardware thread for execution without a need to create a thread for a task code corresponding to each task when the hardware thread reads a flag of a small task code.

12 Claims, 8 Drawing Sheets

(56) References Cited

U.S. PATENT DOCUMENTS

| | | | |
|---|---|---|---|
| 8,561,046 B2 | 10/2013 | Song et al. | |
| 9,619,298 B2* | 4/2017 | Sheaffer | G06F 9/5088 |
| 2008/0184240 A1 | 7/2008 | Franaszek | |
| 2009/0187725 A1 | 7/2009 | Mencias et al. | |
| 2010/0037222 A1 | 2/2010 | Tatsubori et al. | |
| 2012/0284720 A1 | 11/2012 | Cain, III et al. | |

OTHER PUBLICATIONS

Ottoni, G., et al., "Automatic Thread Extraction with Decoupled Software Pipelining," Proceedings of the 38th Annual IEEE/ACM International Symposium on Microarchitecture, Nov. 12-16, 2005, 13 pages.

Ottoni, G., et al., "Global Multi-Thread Instruction Scheduling," Proceedings of the 40th Annual IEEE/ACM International Symposium on Microarchitecture, Dec. 1-5, 2007, 13 pages.

Jesshope, C., et al., "Implementing and efficient vector instruction set in a chip multi-processor using micro-threaded pipelines," 6th Australasian Computer Systems Architecture Conference, Jan. 29-30, 2001, pp. 80-88.

Ahmed, M., et al., "Novel Micro-Threading Techniques on the Cell Broadband Engine," IEEE Symposium on Computers and Communications, Jul. 5-8, 2009, pp. 570-575.

Yang, Q., et al., "A Micro Threading Based Concurrency Model for Parallel Computing," IEEE International Parallel and Distributed Processing Symposium, May 16-20, 2011, pp. 1668-1674.

Bindal, A., et al., "A Simple Micro-Threaded Data-Driven Processor," Proceedings of the Europmicro Systems on Digital System Design, Aug. 31-Sep. 3, 2004, 8 pages.

Long, G., et al., "Minimal Multi-Threading: Finding and Removing Redundant Instructions in Multi-Threaded Processors," Proceeding of the 43rd Annual IEEE/ACM International Symposium on Microarchitecture, Dec. 4-8, 2010, 12 pages.

Danek, M., et al., "Instruction Set Extensions for Multi-Threading in LEON3," 13th International Symposium on Design and Diagnostics of Electronic Circuits and Systems, Apr. 14-16, 2010, pp. 237-242.

"Dynamic Scheduling in RISC Architectures," IEEE Proc.-Comput. Digit. Tech., vol. 143, No. 5, Sep. 1996, pp. 309-317.

Wikipedia, "Thread Pool Pattern," Aug. 18, 2014, 3 pages.

Foreign Communication From a Counterpart Application, European Application No. 14884350.1, Extended European Search Report dated Jan. 3, 2017, 11 pages.

Foreign Communication From a Counterpart Application, PCT Application No. PCT/CN2014/090960, English Translation of International Search Report dated Feb. 15, 2015, 3 pages.

Foreign Communication From a Counterpart Application, PCT Application No. PCT/CN2014/090960, English Translation of Written Opinion dated Feb. 15, 2015, 15 pages.

* cited by examiner

DATA PROCESSING METHOD AND APPARATUS FOR EXECUTING TASK CODE USING RESERVATION INSTRUCTION AND RELEASE INSTRUCTION

CROSS-REFERENCE TO RELATED APPLICATIONS

This patent application is a continuation of international patent application number PCT/CN2014/090960 filed on Nov. 13, 2014, which claims priority to Chinese patent application number 201410076806.9 filed on Mar. 4, 2014, both of which are incorporated by reference.

TECHNICAL FIELD

Embodiments of the present disclosure relate to data processing technologies of an operating system, and in particular, to a data processing method and apparatus.

BACKGROUND

In the prior art, a program sends a request to an operating system, requesting the operating system to execute a task. The operating system allocates a resource for execution of the task requested by the program, creates a thread, loads task parameters and the like to the thread, and places the thread loaded with the task parameters in, for example, a scheduling queue, awaiting a resource to be scheduled by the operating system to execute the thread.

The operating system releases the resource occupied by the executed thread and feeds back an execution result if no exception occurs during execution, and when execution of the thread ends. The thread is re-placed in a waiting queue until the exception is eliminated and the operating system schedules the thread again to continue execution if an exception occurs during execution of the thread.

The inventor finds in research that high overheads are incurred when the operating system creates and releases a thread resource for each task. Especially when a large number of small tasks are executed, overheads for creating and releasing a thread resource for each task account for a large proportion of total running time, reducing system resource utilization.

SUMMARY

Embodiments of the present disclosure provide a data processing method, apparatus, and system to reduce overheads caused by creating and releasing thread resources and improve system resource utilization.

A first aspect of the embodiments of the present disclosure provides a data processing method that is applied to a data processing system, where the data processing system includes an operating system, the operating system manages a hardware thread pool, the hardware thread pool includes a hardware thread, and the method includes receiving, by the hardware thread, a task code that is loaded by the operating system and needs to be executed, where the loaded task code includes multiple subtask codes, where small-task start flags are preset in start positions of the subtask codes, receiving an identifier of a hardware thread that is applied for and reserved by the operating system in the hardware thread pool, and loading a to-be-executed task code after the small-task start flag to the reserved hardware thread corresponding to the identifier of the reserved hardware thread when the hardware thread reads a small-task start flag in a task.

With reference to the first aspect, in a first possible implementation manner provided by the embodiments of the present disclosure, the hardware thread sends a reserved hardware thread release request to the operating system when reading a reserved hardware thread release instruction that is preset in the loaded task code.

A second aspect of the embodiments of the present disclosure provides another data processing method that is applied to a data processing system, where the data processing system includes an operating system, the operating system manages a hardware thread pool, the hardware thread pool includes a hardware thread, the hardware thread is determined as a reserved hardware thread by the operating system, and the method includes receiving, by the hardware thread, a loaded task code, where a small-task start flag is preset in a start position of the loaded task code, and the task code includes multiple subtask codes, where small-task start flags and small-task end flags are preset in start positions and end positions of the subtask codes respectively, and executing, by the hardware thread, the loaded task code, and ending execution and feeding back an execution result when reading the small-task end flag in the loaded task code.

With reference to the second aspect, in a first possible implementation manner of the second aspect provided by the embodiments of the present disclosure, a task code execution exception message is fed back to the operating system such that the operating system loads an execution status of an abnormal subtask code to a blank data structure created by the operating system in advance when an execution exception occurs during execution of the loaded task code by the hardware thread.

A third aspect of the embodiments of the present disclosure provides a data processing method that is applied to a data processing system, where the data processing system includes an operating system, the operating system manages a hardware thread pool, the hardware thread pool includes multiple hardware threads, and the method includes loading, by the operating system, a task code that needs to be executed, reading a hardware thread reservation instruction that is added to a start position of the task code in advance, and receiving a hardware thread reservation request indicated by the hardware thread reservation instruction, where the hardware thread reservation request is to request the operating system to reserve a hardware thread for executing the task code, and the reserved hardware thread is a hardware thread exclusively occupied to execute the task code, applying for and reserving, by the operating system in the hardware thread pool, the hardware thread for executing the task code, directly loading, by the operating system, the task code to the reserved hardware thread such that the reserved hardware thread executes the loaded task code, and obtaining an execution result of the reserved hardware thread.

With reference to the third aspect, in a first possible manner of the third aspect provided by embodiments of the present disclosure, the task code includes subtask codes corresponding to multiple subtasks. After receiving, by the operating system, a hardware thread reservation request, the method further includes creating, by the operating system, a blank data structure, and after directly loading, by the operating system, the task code to the reserved hardware thread, the method further includes receiving, by the operating system, a task code execution exception message that is fed back by the reserved hardware thread, loading, to the blank data structure, an execution status of an abnormal subtask code in the reserved hardware thread that feeds back the message, and placing the data structure to which the execution status of the abnormal task code is loaded, in a task scheduling queue of the operating system for execution, and loading, by the operating system, the to-be-executed subtask codes in the task code that are normal to the reserved hardware thread for subsequent execution.

With reference to the third aspect or the first possible implementation manner of the third aspect, in a second possible implementation manner of the third aspect provided by the embodiments of the present disclosure, a reserved hardware thread release instruction is preset in an end position of the task code, and the method further includes receiving, by the operating system, a reserved hardware thread release request, and releasing the reserved hardware thread according to the request, where the reserved hardware thread release request is sent to the operating system when the reserved hardware thread reads the reserved hardware thread release instruction.

According to a fourth aspect, the embodiments of the present disclosure provide a data processing method, including adding, by a compiler, a hardware thread reservation instruction to a start position of a task code, where the hardware thread reservation instruction is used for sending a hardware thread reservation request to an operating system, and adding, by the compiler, a reserved hardware thread release instruction to an end position of the task code, where the reserved hardware thread release instruction is used for sending a reserved hardware thread release request to the operating system.

According to a fifth aspect, the embodiments of the present disclosure provide a data processing apparatus that is applied to a data processing system, where the data processing system includes an operating system, the operating system manages a hardware thread pool, the hardware thread pool includes the data processing apparatus, and the data processing apparatus includes a receiving unit configured to receive a task code that is loaded by the operating system and needs to be executed, where the task code includes multiple subtask codes, where small-task start flags are preset in start positions of the subtask codes, where the receiving unit is further configured to receive an identifier of a data processing apparatus that is applied for and reserved by the operating system in the hardware thread pool, and a first decoupling unit configured to load a to-be-executed task code after a small-task start flag to the reserved data processing apparatus corresponding to the identifier of the reserved data processing apparatus when reading the small-task start flag in a task.

With reference to the fifth aspect, in a first possible implementation manner of the fifth aspect provided by the embodiments of the present disclosure, the data processing apparatus further includes a release requesting unit configured to send a request to the operating system for releasing the reserved data processing apparatus when reading an instruction, for releasing the reserved data processing apparatus, preset in the loaded task code.

With reference to the fifth aspect, in a second possible implementation manner of the fifth aspect provided by the embodiments of the present disclosure, small-task end flags are preset in end positions of the subtask codes, where the small-task start flags are preset in the start positions of the subtask codes, and the receiving unit is further configured to receive the loaded task code when the data processing apparatus is determined as the reserved data processing apparatus by the operating system, where a small-task start flag is preset in a start position of the loaded task code, and the data processing apparatus further includes an execution unit configured to execute the loaded task code, and end execution and feedback an execution result when reading the small-task end flag in the loaded task code.

According to a sixth aspect, the embodiments of the present disclosure provide a data processing apparatus that is applied to a data processing system, where the data processing apparatus manages a hardware thread pool, the hardware thread pool includes multiple hardware threads, and the data processing apparatus includes a task loading unit configured to load a task code that needs to be executed, a request receiving unit configured to read a hardware thread reservation instruction that is added to a start position of the task code in advance, and receive a hardware thread reservation request indicated by the hardware thread reservation instruction, where the hardware thread reservation request is to request an operating system to reserve a hardware thread for executing the task code, and the reserved hardware thread is a hardware thread exclusively occupied to execute the task code, a processing unit configured to apply for and reserve the hardware thread in the hardware thread pool for executing the task code, a second decoupling unit configured to directly load the task code to the reserved hardware thread such that the reserved hardware thread executes the loaded task code, and a result obtaining unit configured to obtain an execution result of the reserved hardware thread.

With reference to the sixth aspect, in a first possible implementation manner of the sixth aspect provided by the embodiments of the present disclosure, the task code includes subtask codes corresponding to multiple subtasks, and the data processing apparatus further includes a creation unit configured to create a blank data structure when the request receiving unit receives the hardware thread reservation request, and an exception handling unit configured to receive a task code execution exception message that is fed back by the reserved hardware thread, load, to the blank data structure, an execution status of an abnormal subtask code in the reserved hardware thread that feeds back the message, and place the data structure to which the execution status of the abnormal subtask code is loaded, in a task scheduling queue of the operating system for execution, where the second decoupling unit is further configured to load the to-be-executed subtask codes in the task code that are normal to the reserved hardware thread for subsequent execution.

According to a seventh aspect, the embodiments of the present disclosure provide a data processing system, including an operating system and a hardware thread pool, where the operating system manages the hardware thread pool, and the hardware thread pool includes multiple hardware threads, where the operating system is configured to load a task code that needs to be executed, read a hardware thread reservation instruction that is added to a start position of the task code in advance, receive a hardware thread reservation request indicated by the hardware thread reservation instruction, apply for a first hardware thread in the hardware thread pool as a reserved hardware thread, where the reserved hardware thread is a hardware thread exclusively occupied to execute the task code, and load the task code to a second hardware thread except the first hardware thread in the hardware thread pool, where the task code includes multiple subtask codes, where small-task start flags and small-task end flags are preset in start positions and end positions of the subtask codes respectively. the second hardware thread is configured to receive the task code that is loaded by the operating system and needs to be executed, receive an identifier of the first hardware thread that is applied for and reserved by the operating system in the hardware thread pool, and load a to-be-executed task code after A small-task start flag to the first hardware thread that is reserved when reading a small-task start flag in a task, and the first hardware thread that is reserved receives the loaded task code, where a small-task start flag is preset in a start position of the task code loaded to the first hardware thread, and the first hardware thread executes the loaded task code, and ends execution and feeds back an execution result when reading the small-task end flag in the loaded task code.

According to an eighth aspect, the embodiments of the present disclosure provide a data processing apparatus, and the data processing apparatus includes a processor, a communications interface, a storage, and a communications bus, where the processor, the communications interface, and the storage complete communication with each other using the communications bus. The communications interface is configured to receive and send data. The storage is configured to store a program, and the processor is configured to execute the program in the storage in order to execute the method according to any one of the first aspect and the possible implementation manner of the first aspect to the second aspect and the possible implementation manner of the second aspect.

In the embodiments of the present disclosure, after receiving a hardware thread reservation request, an operating system loads a task code to a reserved hardware thread such that the reserved hardware thread executes the task code subsequently. Alternatively, in a process in which an operating system loads a task code to a hardware thread for execution, the hardware thread loads the small task code to a reserved hardware thread for execution when the hardware thread reads a flag of a small task code. Compared with solutions in the prior art in which an operating system creates a thread for a task code corresponding to each task during execution of the task code in the thread, and releases the corresponding thread after the task code corresponding to the task is executed, solutions in the embodiments of the present disclosure substantially reduce system overheads and improve system resource utilization, especially when a task includes a large number of small tasks.

BRIEF DESCRIPTION OF DRAWINGS

The following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

An embodiment of the present disclosure provides a data processing method that is applied to a data processing system. The data processing system includes an operating system and a resource pool of hardware threads used for task code execution. The operating system manages the hardware thread pool. The hardware thread is a physical execution unit used for task code execution, and can take a specific physical form of a chip or a processor. The hardware thread pool includes multiple hardware threads.

Figure 1:
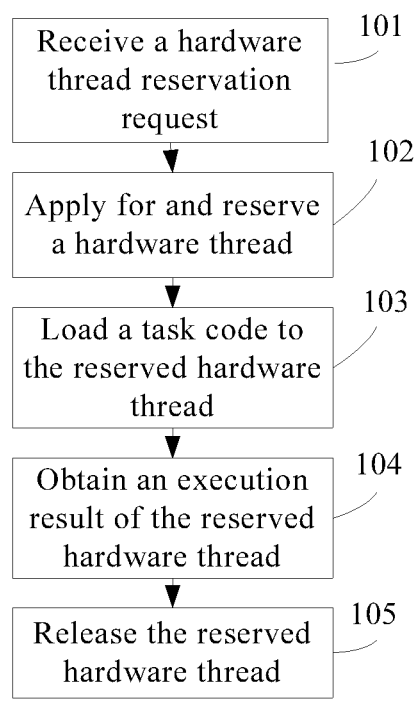
FIG. 1 is a flowchart of a data processing method according to an embodiment of the present disclosure.

Referring to FIG. 1, an embodiment of the present disclosure provides a data processing method that is applied to a data processing system, where the data processing system includes an operating system and a hardware thread resource, and the method includes the following steps.

Step 101: The operating system loads a task code that needs to be executed, reads a hardware thread reservation instruction that is added to a start position of the task code in advance, and receives a hardware thread reservation request indicated by the hardware thread reservation instruction.

The hardware thread reservation request is to request the operating system to reserve a hardware thread for executing the task code, and the reserved hardware thread is a hardware thread exclusively occupied to execute the task code.

Step 102: The operating system applies for and reserves, in a hardware thread pool, a hardware thread for executing the task code.

In this embodiment of the present disclosure, the task code is a task code that needs to be executed after the hardware thread reservation request is received. In a compilation stage of a program, a compiler adds a "hardware thread reservation" instruction to a start position of a task code. The operating system receives a hardware thread reservation request sent by the program to the operating system when loading the program.

The hardware thread is a physical execution unit or device for task code execution. The reserved hardware thread is in an exclusive state when the operating system uses an idle hardware thread in a hardware thread pool as a reserved hardware thread for task code execution.

Step 103: The operating system loads the task code to the reserved hardware thread such that the reserved hardware thread executes the loaded task code.

In this embodiment of the present disclosure, the operating system notifies the reserved hardware thread of an address of the to-be-executed task code, and the reserved hardware thread starts to execute a task from the address of the task code.

Step 104: The operating system obtains an execution result of the reserved hardware thread.

That the operating system obtains an execution result of the reserved hardware thread is merely logical description, and is not limited to that the reserved hardware thread returns a result to the operating system after execution is completed. After task execution is completed, the reserved hardware thread outputs the execution result, stores the result in a specified variable, such as a memory or a register, and then returns the result to the operating system. Alternatively, the reserved hardware thread only identifies that task code execution is completed.

In a compilation stage of program code of a task, a reserved hardware thread release instruction may be added to an end position of a task code. The reserved hardware thread sends a reserved hardware thread release request to the operating system, requesting to release the reserved hardware thread when reading the reserved hardware thread release instruction. Therefore, this embodiment of the present disclosure may further include the following step.

Step 105: The operating system receives a reserved hardware thread release request sent by the reserved hardware thread, and releases the reserved hardware thread according to the request.

The solution of this embodiment of the present disclosure may be applied to a case in which a task code that needs to be executed by an operating system includes subtask codes corresponding to multiple subtasks and most subtasks are small tasks. Using the method in this embodiment of the present disclosure, after the operating system receives a hardware thread reservation request, the operating system sends the task code that needs to be executed to a reserved hardware thread for execution, without a need to create a thread for each subtask in the task code, thereby substantially reducing system overheads and improving system resource utilization.

Figure 2:
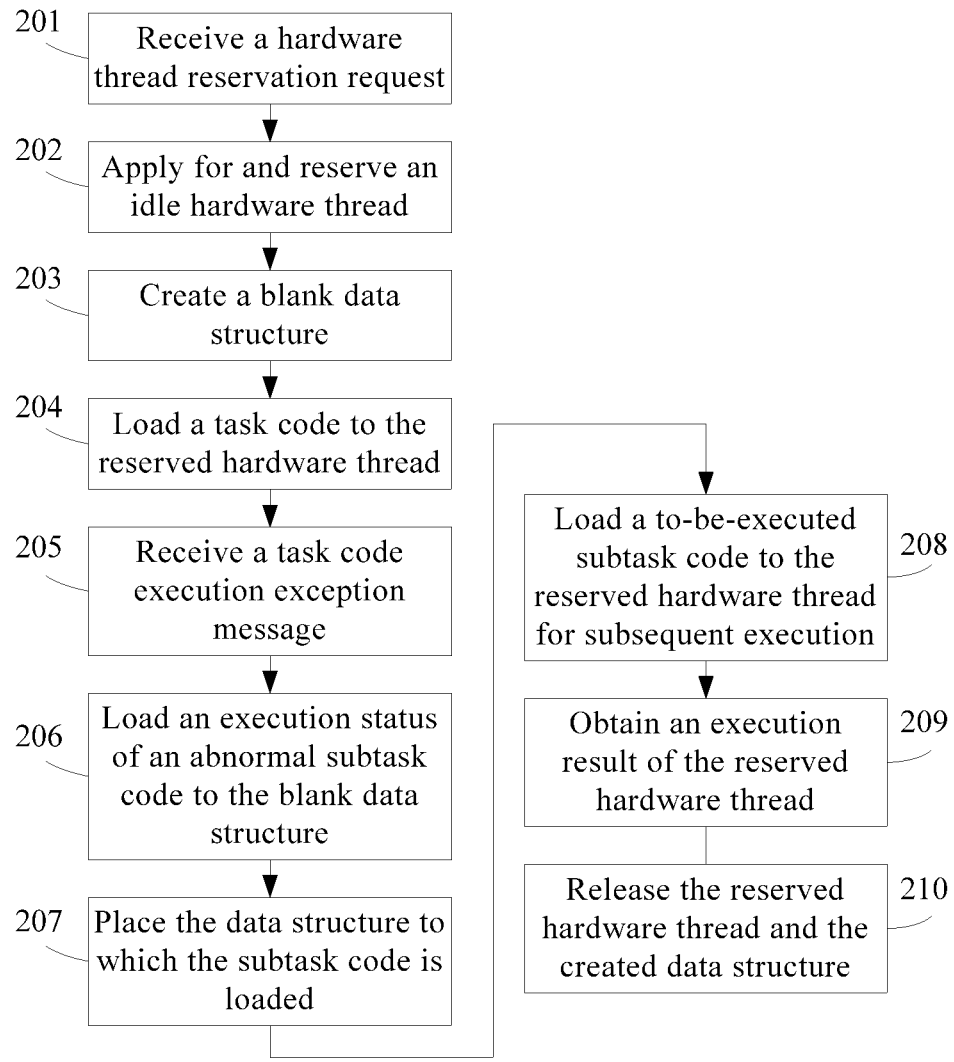
FIG. 2 is a flowchart of another data processing method according to an embodiment of the present disclosure.

An execution exception may occur when the hardware thread executes the subtask codes, and the operating system needs to handle the exception if the task code includes subtask codes corresponding to multiple subtasks. Therefore, referring to FIG. 2, an embodiment of the present disclosure further provides a data processing method, including the following steps.

Step 201: An operating system receives a hardware thread reservation request.

Step 202: The operating system applies for and reserves, in a hardware thread pool, a hardware thread for executing a task code that needs to be executed by the operating system.

The reserved hardware thread may be an idle hardware thread and is set to be in an exclusive state.

Step 203: The operating system creates a blank data structure for thread execution.

The sequence for performing steps 202 and 203 is not limited.

Step 204: The operating system loads the task code to the reserved hardware thread such that the reserved hardware thread executes the loaded task code.

The reserved hardware thread feeds back a task code execution exception message to the operating system when an exception occurs when the reserved hardware thread executes the loaded task code. The operating system loads an execution status of an abnormal subtask code to the created blank data structure, places the data structure to which the execution status of the subtask code is loaded, in a scheduling queue of the operating system for execution, and obtains an execution result when receiving the exception message. Therefore, this embodiment of the present disclosure further includes the following steps.

Step 205: The operating system receives a task code execution exception message fed back by the reserved hardware thread.

Step 206: The operating system loads an execution status of an abnormal subtask code in the hardware thread that feeds back the message, to the blank data structure.

Generally, the execution status of the subtask is a register status.

Step 207: Place the data structure to which the execution status of the abnormal subtask code is loaded, in a task scheduling queue of the operating system for execution.

A position in which the exception occurs exists in a register when an exception occurs when the reserved hardware thread executes the task code. For example, a program counter (PC) records a pointer that points to a current code position reached by the thread during running, and the pointer can be considered as the position in which the exception occurs, that is, a position for restart when the thread resumes running. The operating system can distinguish the current abnormal subtask code from the task code by reading the task code, starting from the position in which the exception occurs on till a "small task end" instruction when encountering an abnormal subtask code in subsequent execution. Therefore, in a program code compilation stage of a task, a "small task end" instruction is preset in an end position of a subtask code, corresponding to each subtask, in a task code.

The data structure is placed in the scheduling queue of the operating system after the abnormal subtask code is restored in the blank data structure. At this moment, the reserved hardware thread is idle and can process a next subtask that is loaded to the reserved hardware thread. The next subtask can be loaded without waiting for execution completion of the abnormal subtask code. A small-task start flag and a small-task end flag are preset in a start position and an end position of each subtask code respectively if the task code includes subtask codes corresponding to multiple subtasks. The operating system may distinguish different subtasks in the task code according to the small-task start flag and the small-task end flag, and separately load the different subtasks in the task code to corresponding hardware threads such that the subtasks in the task can be executed concurrently in different hardware threads when there are multiple reserved hardware threads. All the subtask codes corresponding to the subtasks exist in a form of a queue before being loaded to a reserved hardware thread. The queue can be considered as a warehouse in which multiple subtask codes are serially arranged when there are multiple reserved hardware threads. The multiple reserved hardware threads can be considered as a truck, where the truck is loaded with and executes one or more small task codes each time, and is loaded with next one or more small task codes from the queue upon execution completion. Therefore, step 204 may be distinguishing, by the operating system, different subtask codes in the task code according to the small-task start flag and the small-task end flag, and separately loading the subtasks to corresponding reserved hardware threads such that the multiple reserved hardware threads perform execution concurrently. The operating system can determine which subtask codes are loaded to a same hardware thread depending on whether execution results of the different subtask codes need to be successive.

Step 208: The operating system loads to-be-executed subtask codes in the task code that are normal to the reserved hardware thread for subsequent execution.

The execution result of the abnormal subtask is notified after the operating system obtains the execution result of the abnormal subtask code when a task is loaded to the reserved hardware thread and when execution of the task code after the abnormal subtask code requires the execution result of the abnormal subtask. For example, the execution result of the abnormal subtask is placed in a variable and waits to be read when a next task is executed.

Step 209: The operating system obtains an execution result of the reserved hardware thread.

Step 210: The operating system receives a reserved hardware thread release request sent by the reserved hardware thread, and releases the reserved hardware thread and the created data structure according to the request.

The operating system clears an execution status of the task code, such as a register status, of the reserved hardware thread, cancels the exclusive state of the reserved hardware thread, and places the reserved hardware thread back to a hardware thread resource pool after receiving the reserved hardware thread release request.

In this embodiment of the present disclosure, an operating system creates in advance a blank data structure for thread execution. An execution status of a current task is restored in the blank data structure, and the data structure is placed in a scheduling queue for scheduling and execution, which avoids a case in which the task cannot be executed because the exception occurs during task execution performed by the hardware thread.

Figure 3:
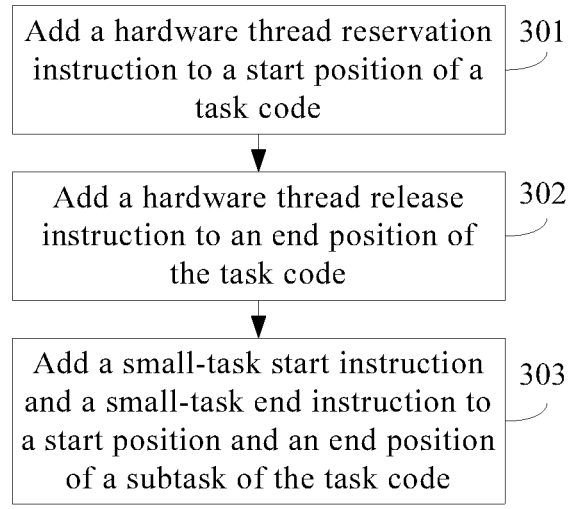
FIG. 3 is a flowchart of another data processing method according to an embodiment of the present disclosure.

Referring to FIG. 3, an embodiment of the present disclosure further provides a data processing method. A task code that needs to be executed is compiled using this method. A compiler that executes the method may be included in the data processing system in the foregoing embodiments, or may be a separate apparatus independent of the data processing system. The method includes the following steps.

Step 301: The compiler adds a hardware thread reservation instruction to a start position of program code of a task, where the hardware thread reservation instruction is used for sending a hardware thread reservation request to an operating system.

Step 302: The compiler adds a reserved hardware thread release instruction to an end position of the program code of the task, where the reserved hardware thread release instruction is used for sending a reserved hardware thread release request to the operating system.

Steps 301 and 302 do not indicate an execution sequence. After receiving the hardware thread reservation request, the operating system reserves a hardware thread in a hardware thread resource pool for task execution. The reserved hardware thread sends the reserved hardware thread release request to the operating system when reading a hardware thread destruction instruction. The operating system performs operations of releasing the reserved hardware thread and the like after receiving a hardware thread destruction request.

A small-task start flag and a small-task end flag are added respectively to a start position and an end position of a code corresponding to each subtask determined as a small task if a task code includes subtask codes corresponding to multiple subtasks, and the method may further include the following step.

Step 303: Add a small-task start flag and a small-task end flag respectively to a start position and an end position of each subtask in the task, where the small-task start flag and the small-task end flag are used to identify start and an end of a small task.

The sequence for performing steps 301, 302, and 303 is not limited.

In this embodiment of the present disclosure, a compiler adds a hardware thread reservation instruction and a reserved hardware thread release instruction to a start position and an end position of program code of a task such that a program sends a hardware thread reservation request to an operating system, and a hardware thread that executes the task sends a reserved hardware thread release request to the operating system after the hardware thread reads the reserved hardware thread release instruction.

Figure 4:
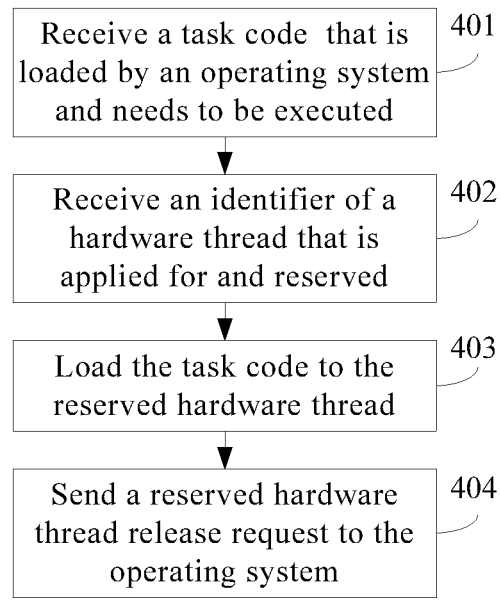
FIG. 4 is a schematic flowchart of another data processing method according to an embodiment of the present disclosure.

Referring to FIG. 4, an embodiment of the present disclosure further provides a data processing method. Different from the method shown in FIG. 2, in this method, a task code that needs to be executed includes multiple subtask codes, some subtasks in the multiple subtask codes are identified as small tasks in advance, and small-task start flags are preset in start positions of codes of the small tasks. Therefore, the task code loaded to a hardware thread by an operating system includes the multiple subtask codes, where small-task start flags are preset in start positions of the subtask codes, and also includes a subtask code, where no small-task start flag is set in a start position of the subtask code. The subtask code in which no small-task start flag is set is not considered as a small task.

In this embodiment, the operating system loads the task code to a common hardware thread. The common hardware thread is opposite to a reserved hardware thread, and the common hardware thread is not reserved by the operating system. In a hardware thread pool, the common hardware thread and the reserved hardware thread can implement a same function, only different in a role they play during task code execution. The common hardware thread decouples and sends a subsequent task code that needs to be executed to the reserved hardware thread for execution if the common hardware thread encounters a small-task start flag during task code execution. The reserved hardware thread completes current execution and feeds back a result when reading a small-task end flag.

In this way, the common hardware thread decouples the small task codes in the task code and loads them to the reserved hardware thread for execution, and the operating system does not need to create a thread for executing each small task, or destroy a thread upon completion of small task execution. Therefore, the data processing method provided in FIG. 4 is applied to a data processing system, where the data processing system includes an operating system, the operating system manages a hardware thread pool, the hardware thread pool includes a hardware thread, and the method includes the following steps.

Step 401: The hardware thread receives a task code that is loaded by the operating system and needs to be executed, where the loaded task code includes multiple subtask codes, where small-task start flags are preset in start positions of the subtask codes.

Step 402: Receive an identifier of a hardware thread that is applied for and reserved by the operating system in the hardware thread pool.

After receiving a hardware thread reservation request, the operating system applies for and reserves a hardware thread in the hardware thread pool, sets the reserved hardware thread to be in an exclusive state, and sends an identifier of the reserved hardware thread to a hardware thread that executes the task code, namely, the foregoing common hardware thread.

Step 403: The hardware thread loads a to-be-executed task code after the small-task start flag to the reserved hardware thread corresponding to the identifier of the reserved hardware thread when reading a small-task start flag in a task code.

In this way, the hardware thread decouples small task codes in the task code and loads them to the reserved hardware thread for execution, and the operating system does not need to create a thread for executing each small task or destroy a thread upon completion of small task execution. This substantially reduces overheads, especially when there are a large number of small tasks.

After the entire task code is executed, the operating system needs to release the reserved hardware thread. Therefore, the method may further include the following step.

Step 404: The hardware thread sends a reserved hardware thread release request to the operating system when reading a reserved hardware thread release instruction preset in the loaded task code.

Figure 5:
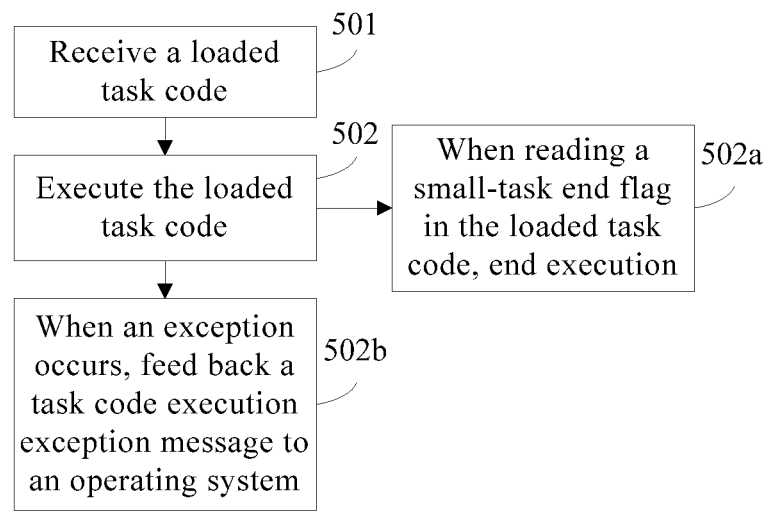
FIG. 5 is a schematic flowchart of another data processing method according to an embodiment of the present disclosure.

Referring to FIG. 5, an embodiment of the present disclosure further provides a data processing method, and the data processing method is described from a perspective of a reserved hardware thread. The method is applied to a data processing system, the data processing system includes an operating system, the operating system manages a hardware thread pool, the hardware thread pool includes a hardware thread, and the hardware thread is determined as a reserved hardware thread by the operating system. The method includes the following steps.

Step 501: The hardware thread receives a loaded task code, where a small-task start flag is preset in a start position of the loaded task code, and the task code includes multiple subtask codes, where small-task start flags and small-task end flags are preset in start positions and end positions of the subtask codes respectively.

Step 502: The hardware thread executes the loaded task code.

Step 502a: When reading a small-task end flag in the loaded task code, the hardware thread ends execution and feeds back an execution result.

The operating system needs to be involved when an exception occurs during execution of the loaded task code performed by the hardware thread. Therefore, the method further includes the following step.

Step 502b. When an execution exception occurs in a process of executing the loaded task code by the hardware thread, the hardware thread feeds back a task code execution exception message to the operating system such that the operating system loads an execution status of an abnormal subtask code to a blank data structure created by the operating system in advance.

To execute the foregoing method, an embodiment of the present disclosure further provides a data processing apparatus. An implementation principle and technical effects of the data processing apparatus are similar to those of the method, and reference may be made to description of the foregoing method embodiments.

Figure 6:
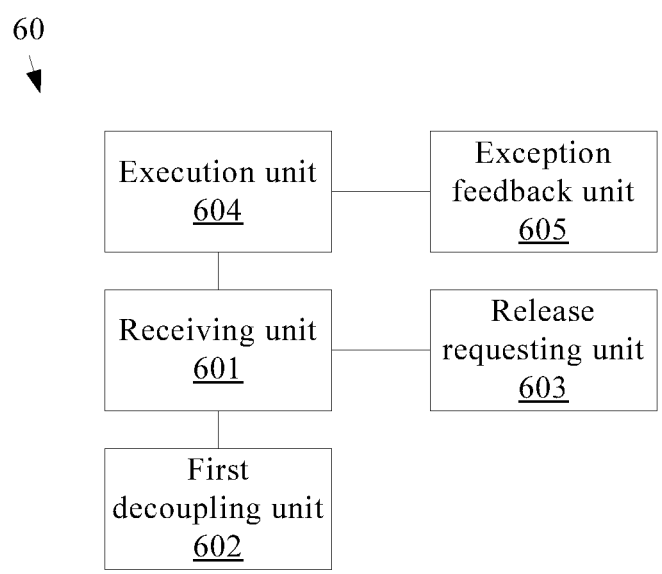
FIG. 6 is a schematic diagram of a structure of a data processing apparatus according to an embodiment of the present disclosure.

Referring to FIG. 6, an embodiment of the present disclosure provides a data processing apparatus 60 to perform the method embodiments corresponding to FIG. 4 and FIG. 5. The data processing apparatus is applied to a data processing system. The data processing system includes an operating system, the operating system manages a hardware thread pool, and the hardware thread pool includes the data processing apparatus. The data processing apparatus is a physical execution unit that executes a task code and is the same as the foregoing hardware thread. In specific implementation, the data processing apparatus may take a form of a chip that has a data processing function or a processor.

The data processing apparatus 60 includes a receiving unit 601 configured to receive a task code that is loaded by the operating system and needs to be executed, where the task code includes multiple subtask codes, where small-task start flags are preset in start positions of the subtask codes, where the receiving unit 601 is further configured to receive an identifier of a data processing apparatus that is applied for and reserved by the operating system in the hardware thread pool, and a first decoupling unit 602 configured to load a to-be-executed task code after the small-task start flag to the reserved data processing apparatus corresponding to the identifier of the reserved data processing apparatus when reading a small-task start flag in a task.

The data processing apparatus 60 may further include a release requesting unit 603 configured to preset in the loaded task code, send a request to the operating system for releasing the reserved data processing apparatus when reading an instruction, for releasing the reserved data processing apparatus.

Small-task end flags are preset in end positions of the subtask codes when the data processing apparatus 60 is determined as the reserved data processing apparatus by the operating system, where the small-task start flags are preset in the start positions of the subtask codes, where the receiving unit 601 is further configured to receive the loaded task code, where a small-task start flag is preset in a start position of the loaded task code, and the data processing apparatus 60 further includes an execution unit 604 configured to execute the loaded task code, and end execution and feedback an execution result when reading a small-task end flag in the loaded task code.

Further, a feedback needs to be sent to the operating system when the data processing apparatus 60 is determined as the reserved data processing apparatus, and an exception occurs during execution of the loaded task code. Therefore, the data processing apparatus 60 may further include an exception feedback unit 605 configured to feedback a task code execution exception message to the operating system such that the operating system loads an execution status of an abnormal subtask code to a blank data structure created by the operating system in advance when an execution exception occurs in a process of executing the loaded task code by the execution unit 604.

The data processing apparatus decouples small task codes in a task code and loads them to a reserved data processing apparatus for execution, and an operating system does not need to create a thread for executing each small task or destroy a thread upon completion of small task execution. This substantially reduces overheads.

Figure 7:
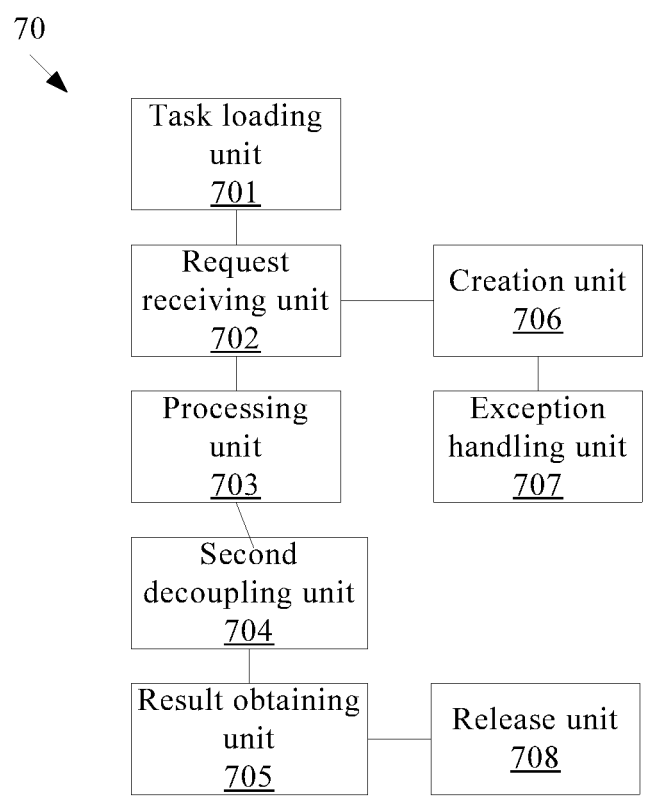
FIG. 7 is a schematic diagram of a structure of another data processing apparatus according to an embodiment of the present disclosure.

Referring to FIG. 7, an embodiment of the present disclosure further provides a data processing apparatus 70 to implement the method corresponding to FIG. 1. The data processing apparatus 70 is applied to a data processing system, and manages a hardware thread pool, where the hardware thread pool includes multiple hardware threads. In specific implementation, the data processing apparatus 70 may be an operating system that manages a hardware thread pool.

The data processing apparatus 70 includes a task loading unit 701 configured to load a task code that needs to be executed, a request receiving unit 702 configured to read a hardware thread reservation instruction that is added to a start position of the task code in advance, and receive a hardware thread reservation request indicated by the hardware thread reservation instruction, where the hardware thread reservation request is to request an operating system to reserve a hardware thread for executing the task code, and the reserved hardware thread is a hardware thread exclusively occupied to execute the task code, a processing unit 703 configured to apply for and reserve the hardware thread in the hardware thread pool for executing the task code, a second decoupling unit 704 configured to directly load the task code to the reserved hardware thread such that the reserved hardware thread executes the loaded task code, and a result obtaining unit 705 configured to obtain an execution result of the reserved hardware thread.

The task code includes subtask codes corresponding to multiple subtasks, and the data processing apparatus 70 may further include a creation unit 706 configured to create a blank data structure when the request receiving unit 702 receives the hardware thread reservation request, and an exception handling unit 707 configured to receive a task code execution exception message that is fed back by the reserved hardware thread, load, to the blank data structure, an execution status of an abnormal subtask code in the reserved hardware thread that feeds back the message, and place the data structure to which the execution status of the abnormal subtask code is loaded, in a task scheduling queue of the operating system for execution. The second decoupling unit 704 is further configured to load the to-be-executed subtask codes in the task code that are normal to the reserved hardware thread for subsequent execution.

A reserved hardware thread release instruction is preset in an end position of the task code, and the data processing apparatus 70 further includes a release unit 708 configured to receive a reserved hardware thread release request, and release the reserved hardware thread according to the request, where the reserved hardware thread release request is sent to the operating system when the reserved hardware thread reads the reserved hardware thread release instruction.

The data processing apparatus according to this embodiment of the present disclosure sends a task code to a reserved hardware thread for execution without a need to create a thread for each subtask in the task code and destroy a thread upon subtask completion, thereby substantially reducing system overheads. In addition, the data processing apparatus creates a blank data structure. An execution status of a subtask code can be loaded in order to restore execution of the subtask code in which the exception occurs, improving reliability of task code execution when an exception occurs during execution of a subtask.

Figure 8A:
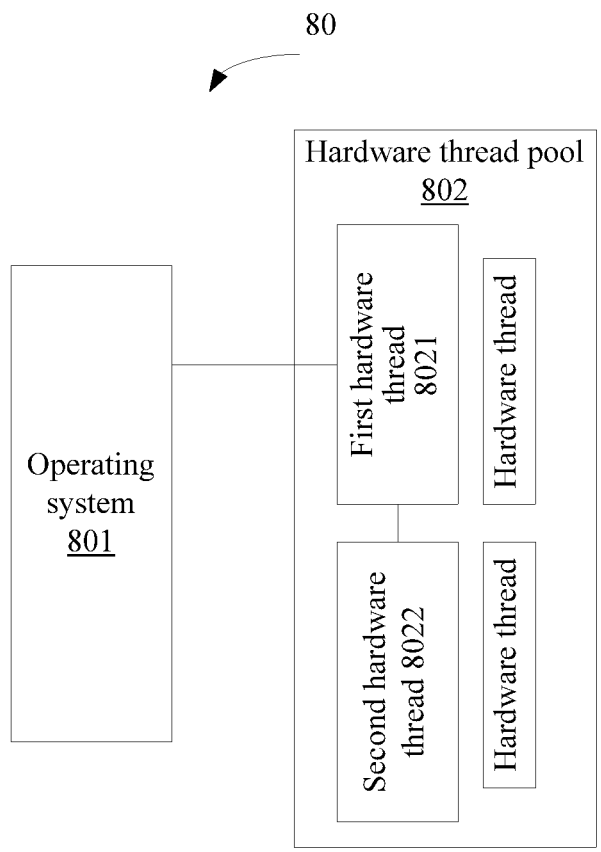
FIG. 8A is a schematic diagram of a structure of a data processing system according to an embodiment of the present disclosure.

Referring to FIG. 8A, an embodiment of the present disclosure further provides a data processing system 80, including an operating system 801 and a hardware thread pool 802, where the hardware thread pool 802 includes multiple hardware threads, for example, a first hardware thread 8021 and a second hardware thread 8022.

The operating system 801 is configured to load a task code that needs to be executed, read a hardware thread reservation instruction that is added to a start position of the task code in advance, and receive a hardware thread reservation request indicated by the hardware thread reservation instruction, apply for the first hardware thread 8021 in the hardware thread pool 802 as a reserved hardware thread, where the reserved hardware thread is a hardware thread exclusively occupied to execute the task code, and load the task code to the second hardware thread 8022 except the first hardware thread in the hardware thread pool, where the task code includes multiple subtask codes, where small-task start flags and small-task end flags are preset in start positions and end positions of the subtask codes respectively.

The second hardware thread 8022 is configured to receive the task code that is loaded by the operating system 801 and needs to be executed, receive an identifier of the first hardware thread 8021 that is applied for and reserved by the operating system 801 in the hardware thread pool 802, and load a to-be-executed task code after the small-task start flag to the first hardware thread 8021 that is reserved when reading a small-task start flag in a task.

The first hardware thread 8021 that is reserved receives the loaded task code, where a small-task start flag is preset in a start position of the task code loaded to the first hardware thread 8021, and the first hardware thread 8021 executes the loaded task code, and ends execution and feeds back an execution result when reading the small-task end flag in the loaded task code.

Figure 8B:
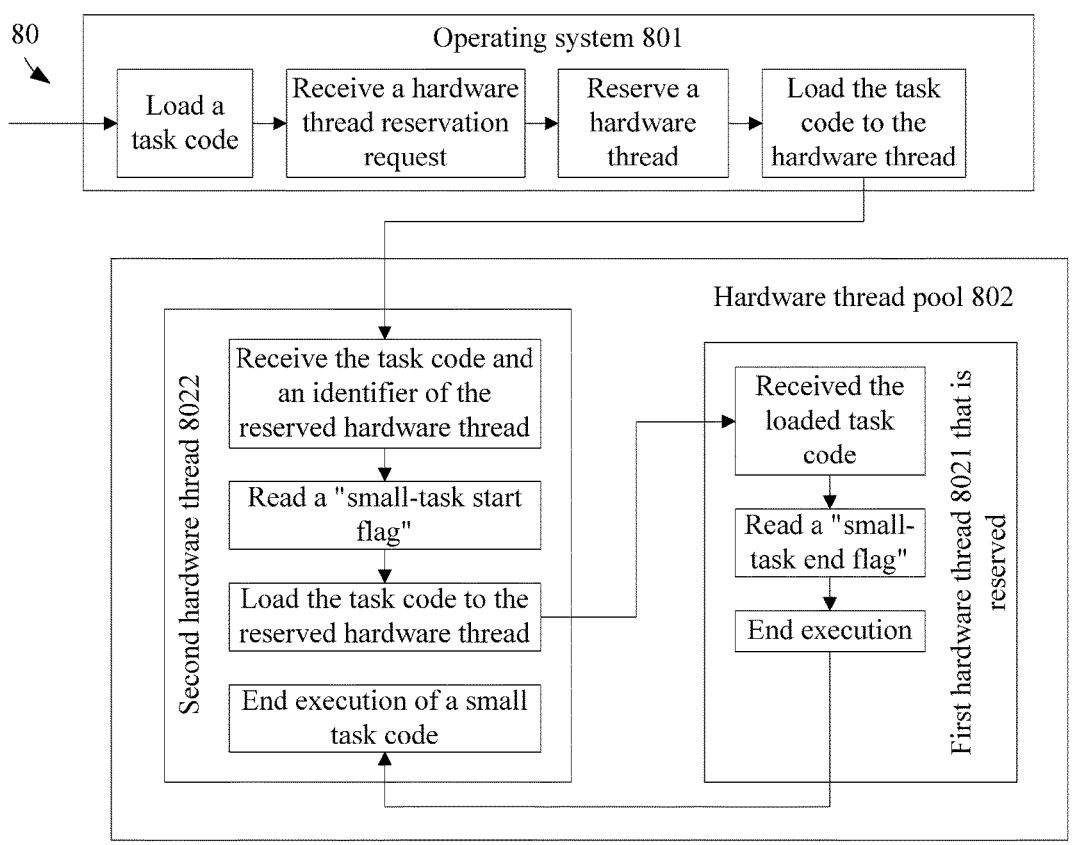
FIG. 8B is schematic flowchart of task code execution performed by a data processing system according to an embodiment of the present disclosure.

The first hardware thread 8021 that is reserved feeds back an execution result, clears data, restores to a reserved state, and waits for a next small task code to be loaded for execution when completing a small task code. FIG. 8B is a flowchart of execution performed by the data processing system 80.

Figure 9:
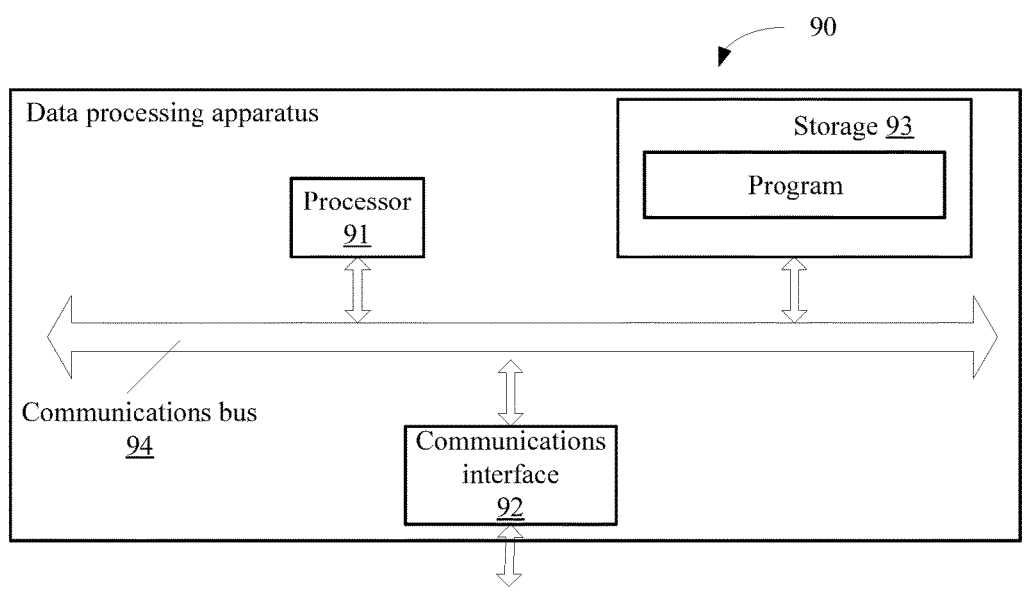
FIG. 9 is a schematic diagram of a structure of a data processing apparatus according to an embodiment of the present disclosure.

Referring to FIG. 9, an embodiment of the present disclosure further provides a data processing apparatus 90, where the data processing apparatus includes a processor 91, a communications interface 92, a storage 93, and a communications bus 94, where the processor 91, the communications interface 92, and the storage 93 complete communication with each other using the communications bus 94. The communications interface 92 is configured to receive and send data. The storage 93 is configured to store a program, and the processor 91 is configured to execute the program in the storage 93 in order to execute either one of the methods corresponding to FIG. 4 and FIG. 5.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The functions may be stored in a computer-readable storage medium when the functions are implemented in the form of a software functional unit and sold or used as an independent product. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method for executing a task code in a computer, the computer running an operating system to manage execution of a plurality of task codes, the operating system managing a hardware thread pool which comprises multiple hardware threads, and the method being performed by the computer using the operating system and comprising:
   reading, by the operating system, a hardware thread reservation instruction preset in the task code by a compiler, the hardware thread reservation instruction comprising a hardware thread reservation request, and the hardware thread reservation request requesting the operating system to allocate a hardware thread in the hardware thread pool for executing the task code;
   allocating, by the operating system, the hardware thread for executing the task code;
   loading, by the operating system, the task code to the hardware thread such that the hardware thread executes the loaded task code;
   obtaining an execution result from the hardware thread after the task code is executed;
   reading, by the operating system, a hardware thread release instruction preset in the task code by the compiler, the hardware thread release instruction requesting the operating system to release the hardware thread in the hardware thread pool from executing the task code when the entire task code has been executed; and
   releasing, by the operating system, the hardware thread from executing the task code, and
   wherein the task code comprises subtask codes corresponding to multiple subtasks, the multiple subtasks needing to be executed for the task code to complete execution, a small-task start flag being preset in a start position of each subtask code, a small-task end flag being preset in an end position of each subtask code, multiple hardware threads have been allocated to multiple tasks, and loading the task code to the hardware thread comprises:
      distinguishing, by the operating system, different subtask codes in the task code according to the small-task start flag and the small-task end flag for each subtask code; and
      separately loading the subtask codes corresponding to different subtasks such that the multiple hardware threads execute the loaded task code concurrently.

2. The method according to claim 1, wherein the method further comprises creating, by the operating system, a data structure, and after loading the task code to the hardware thread, the method further comprises:
   receiving, by the operating system, a task code execution exception message that is from the hardware thread, the task code execution exception message indicating that an exception has occurred while processing the task code;
   loading, to the data structure, an execution status of an abnormal subtask code in the hardware thread that feeds back the task code execution exception message; and
   placing the data structure to which the execution status of the abnormal subtask code is loaded in a task scheduling queue of the operating system for execution, the task scheduling queue comprising a plurality of to-be-executed subtasks that are waiting to be executed by the hardware thread.

3. The method according to claim 1, further comprising:
   receiving, by the operating system, a hardware thread release request; and
   releasing the hardware thread accordingly, the hardware thread release request is sent to the operating system when the hardware thread reads the hardware thread release instruction.

4. The method according to claim 2, further comprising:
   receiving, by the operating system, a hardware thread release request; and
   releasing the hardware thread accordingly, the hardware thread release request being sent to the operating system when the hardware thread reads the hardware thread release instruction.

5. A computer, comprising:
   a storage device configured to store a program code of an operating system for managing execution of a plurality of task codes; and
   a processor coupled to the storage device and configured to execute the program code of the operating system to:
      read a hardware thread reservation instruction preset in a task code by a compiler, the hardware thread reservation instruction comprising a hardware thread reservation request, and the hardware thread reservation request requesting the operating system to allocate a hardware thread in a hardware thread pool for executing the task code;
      allocate the hardware thread for executing the task code;
      load the task code to the hardware thread such that the hardware thread executes the loaded task code;
      obtain an execution result from the hardware thread after the task code is executed;
      read a hardware thread release instruction preset in the task code by the compiler, the hardware thread release instruction requesting the operating system to release the hardware thread in the hardware thread pool from executing the task code when the entire task code has been executed; and
      release the hardware thread from executing the task code, and
   wherein the task code comprises subtask codes corresponding to multiple subtasks, the multiple subtasks needing to be executed for the task code to complete execution, a small-task start flag being preset in a start position of each subtask code, a small-task end flag being preset in an end position of each subtask code, multiple hardware threads have been allocated to multiple tasks, and the processor further executing the program code of the operating system to:
      distinguish different subtask codes in the task code according to the small-task start flag and the small-task end flag for each subtask code; and
      separately load the subtask codes corresponding to different subtasks such that the multiple hardware threads execute the loaded task code concurrently.

6. The computer according to claim 5, wherein the processor further executes the program code of the operating system to:
   create a data structure;
   receive a task code execution exception message from the hardware thread after loading the task code to the hardware thread, the task code execution exception message indicating that an exception has occurred while processing the task code;
   load, to the data structure, an execution status of an abnormal subtask code in the hardware thread that feeds back the task code execution exception message; and
   place the data structure to which the execution status of the abnormal subtask code is loaded in a task scheduling queue of the operating system for execution, the task scheduling queue comprising a plurality of to-be-executed subtasks that are waiting to be executed by the hardware thread.

7. The computer according to claim 5, wherein the processor further executes the program code of the operating system to:
   receive a hardware thread release request; and
   release the hardware thread accordingly, the hardware thread release request being sent to the operating system when the hardware thread reads the hardware thread release instruction.

8. The computer according to claim 6, wherein the processor further executes the program code of the operating system to:
   receive a hardware thread release request; and
   release the hardware thread accordingly, the hardware thread release request being sent to the operating system when the hardware thread reads the hardware thread release instruction.

9. The method according to claim 1, further comprising:
   notifying, by the operating system, the hardware thread of an address of the task code; and
   executing, by the hardware thread, the task code according to the address of the task code.

10. The method according to claim 1, further comprising:
    recording, by the operating system, a position in the task code in which an exception occurs; and
    resuming execution, by the hardware thread, of the task code according to the position in the task code in which the exception occurs.

11. The computer according to claim 5, wherein the processor further executes the program code of the operating system to:
    notify the hardware thread of an address of the task code; and
    executing the task code according to the address of the task code.

12. The computer according to claim 5, wherein the processor further executes the program code of the operating system to:
    record a position in the task code in which an exception occurs; and
    resume execution of the task code according to the position in the task code in which the exception occurs.

* * * * *